(12) United States Patent
Folgerø-Holm

(10) Patent No.: US 12,650,390 B2
(45) Date of Patent: Jun. 9, 2026

(54) WEAR SENSOR

(71) Applicant: Siemens Energy AS, Oslo (NO)

(72) Inventor: Jan Inge Folgerø-Holm, Foldroyhamn (NO)

(73) Assignee: SIEMENS ENERGY AS, Oslo (NO)

( * ) Notice: Subject to any disclaimer, the term of this patent is extended or adjusted under 35 U.S.C. 154(b) by 83 days.

(21) Appl. No.: 18/727,352

(22) PCT Filed: Jan. 17, 2023

(86) PCT No.: PCT/EP2023/050941
§ 371 (c)(1),
(2) Date: Jul. 9, 2024

(87) PCT Pub. No.: WO2023/139042
PCT Pub. Date: Jul. 27, 2023

(65) Prior Publication Data
US 2025/0076217 A1 Mar. 6, 2025

(30) Foreign Application Priority Data

Jan. 18, 2022 (GB) ...................................... 2200534

(51) Int. Cl.
*G01N 21/954* (2006.01)
*G01B 11/02* (2006.01)
(52) U.S. Cl.
CPC ........... *G01N 21/954* (2013.01); *G01B 11/02* (2013.01); *G01N 2021/9546* (2013.01)
(58) Field of Classification Search
CPC ......... G01N 21/954; G01N 2021/9546; G01N 17/04; G01N 21/8507; G01N 27/04; G01N 27/20; G01B 11/02; G01B 11/06
See application file for complete search history.

(56) References Cited

U.S. PATENT DOCUMENTS

| | | | | | |
|---|---|---|---|---|---|
| 4,976,157 A | * | 12/1990 | Berthold | ................... | G01F 1/28 |
| | | | | | 73/861.24 |
| 7,015,484 B2 | * | 3/2006 | Gillispie | ............... | G01J 3/4406 |
| | | | | | 250/459.1 |

(Continued)

FOREIGN PATENT DOCUMENTS

| | | | |
|---|---|---|---|
| DE | 102016207312 A1 | 11/2017 | |
| EP | 1403613 A1 | 3/2004 | |

(Continued)

OTHER PUBLICATIONS

PCT International Search Report and Written Opinion of International Searching Authority mailed Apr. 4, 2023 corresponding to PCT International Application No. PCT/E P2023/050941 filed Jan. 17, 2023.

*Primary Examiner* — Abdullahi Nur

(57) ABSTRACT

An intrusive wear sensor (1) comprises one or more optical fibres (22, 122, 222) mounted in an intrusive probe housing (20), one end of the one or more optical fibres being adapted to be directly exposed to a process fluid in use. An electronics module (13) is mounted in the wear sensor and separated from the process fluid flow (14) by a barrier (16). The electronics module (13) comprises a light transmitter (27) to transmit a light beam (23) along the one or more optical fibres to an interface (21, 121, 221) with the process fluid; and a light detector (26) to receive the reflected light (24), whereby a change in length of the one or more optical fibres (22, 122, 222) may be determined from a change in detected time of travel of the light beam (23, 24).

13 Claims, 3 Drawing Sheets

(56)                   References Cited

U.S. PATENT DOCUMENTS

| 7,551,288 | B1 * | 6/2009 | Discenzo | ........... | G01B 9/02027 |
| | | | | | 356/477 |
| 8,571,813 | B2 * | 10/2013 | Johnston | ............. | G01M 5/0033 |
| | | | | | 702/34 |
| 11,867,586 | B2 | 1/2024 | Kjaer et al. | | |
| 2012/0043980 | A1 * | 2/2012 | Davies | ..................... | G01B 7/18 |
| | | | | | 324/693 |
| 2017/0205253 | A1 * | 7/2017 | Handerek | ............ | G01D 5/3539 |
| 2018/0299375 | A1 * | 10/2018 | Young | .................... | G01N 21/31 |
| 2019/0025095 | A1 * | 1/2019 | Steel | ...................... | G01K 11/32 |

FOREIGN PATENT DOCUMENTS

| EP | 3385007 | A1 * | 10/2018 | ............ | G01N 27/20 |
| FR | 2710740 | A1 | 4/1995 | | |
| WO | 2020157028 | A1 | 8/2020 | | |
| WO | WO-2022264047 | A1 * | 12/2022 | ............ | F16C 17/246 |

* cited by examiner

30 — Install wear sensor in pipeline

31 — Transmit light beam down optical fibre, to the probe/fibre end intruded into the flow 32 — Receive light beam, reflected from the fibre end, at light detector 33 — Determine rate of wear of monitored pipeline or equipment from time/distance travelled by the light beam 34 — Repeat steps 30 to 33 and provide data to a controller for interpretation

WEAR SENSOR

This invention relates to a wear sensor for subsea, or underwater use and an associated method, such as an erosion sensor.

In oil and gas exploration, pipelines laid subsea are difficult to access and expensive to maintain or repair, requiring hire of specialised vessels and use of divers. However, the consequences of a pipeline failure due to gradual wear of the pipeline material itself, typically caused by erosion, may be significant. Thus, it is desirable to be able to monitor the state of the subsea pipeline and take steps to mitigate damage, or schedule repairs when a vessel is going to be on site for other reasons. Conventionally, erosion sensors have a first sensor element, which is subjected to the same harsh environment as the equipment or pipeline being monitored and a second, reference, sensor element that is protected from that environment and allows a comparison to determine the state of the pipeline. These sensors rely on resistance or conductivity measurements.

In accordance with a first aspect of the present invention, an intrusive wear sensor comprising one or more optical fibres mounted in an intrusive probe housing, one end of the one or more optical fibres being adapted to be directly exposed to a process fluid in use: an electronics module mounted in the wear sensor and separated from the process fluid flow by a barrier; the electronics module comprising a light transmitter to transmit a light beam along the one or more optical fibres to an interface with the process fluid; and a light detector to receive the reflected light, whereby a change in length of the one or more optical fibres may be determined from a change in detected time of travel of the light beam.

The light transmitter and light detector may be combined in a single unit, in line with the one or more optical fibres, but preferably the sensor further comprises a reflector to receive light reflected back from the interface with the process fluid and direct the reflected light to a separate detector.

The wear sensor may further comprise a communications link to a control unit, remote from the sensor.

The sensor may further comprise an electrical penetrator between the electronics module and the communications link.

The part of the wear sensor subject to process fluid may have a length of up to 30 mm.

Each sensing element may have a diameter of up to 30 mm.

The wear sensor may further comprise an electrically conducting outer housing containing the sensing elements.

The material of the outer housing may comprise a metal alloy, such as alloy 625.

In accordance with a second aspect of the present invention, a method of detecting wear in a wear sensor according to any preceding claim, the method comprising installing the wear sensor in a process fluid pipeline such that one end of the one or more optical fibres is adapted to be directly exposed to a process fluid in use; transmitting a light beam from the electronics module along the one or more optical fibres to an interface with the process fluid, receiving light reflected back from the interface with the process fluid at the light detector; and, determining a change in length of the one or more optical fibres from a change in detected time of travel of the light beam.

The method may further comprise providing a reflector in the path of the light reflected back from the interface to the detector; and reflecting the light to the detector in the electronics module.

The method may further comprise comparing the detected time of travel or determined change of length with stored data to derive a rate of wear of an article being monitored by the wear sensor.

The method may further comprise transmitting data relating to the detected time of travel or determined change of length to a control unit, remote from the sensor.

The drive to reduce overall lifecycle costs, both capital expenditure (CAPEX) and operational expenditure (OPEX), associated with deep-water oil and gas developments means that improvements to existing designs, manufacturing processes and operation are desirable. Reducing operational costs of maintenance of subsea equipment relies on remote monitoring of the status of the equipment and adapting the operation to reduce the rate of wear, or scheduling equipment replacement to coincide with other works that also require vessel or diver services, to reduce the overheads.

The present invention addresses the difficulties encountered with such remote monitoring of gradual wear using conventional subsea erosion sensors. Conventional erosion sensors typically measure electrical resistance, for example, to be able to determine how eroding material such as sand has affected the wall thickness of a process pipeline. In sensing systems that use intrusion sensors, i.e., sensors that are subject to the same wear damage as the equipment or pipeline because they are directly in the process fluid flow, the sensors eventually wear out. For example, erosion monitoring in a harsh environment may include extreme temperature environments, in particular operating at high operating temperatures in situation where there is relatively high wear on vital parts, such as forges, gas turbines, engines, exhaust systems, power plants, or nuclear operations. Electrical resistance erosion elements are normally designed as one sensing element in various shapes subjected to erosion, and one or two reference elements not subjected to erosion. The erosion sensors measurement is based on changes in resistance or conductivity at the front section of the sensor. The measurement is done in an electrical conductor isolated from its surroundings by ceramic or PEEK or plastics material. Electrical resistance measurements may be subject to electromagnetic interference, so the sensor design has to protect the electrical parts from that, adding cost and complexity. In addition, the corrosion sensors typically have a shorter lifespan than the pipeline or equipment being monitored, so have to be replaced at some point.

The present invention provides a wear sensor that can be designed to have a similar lifespan to the pipeline or equipment being monitored, as well as being unaffected by electromagnetic interference. The eroding section is passive and immune to electromagnetic interference, or similar problems.

Figure 1:
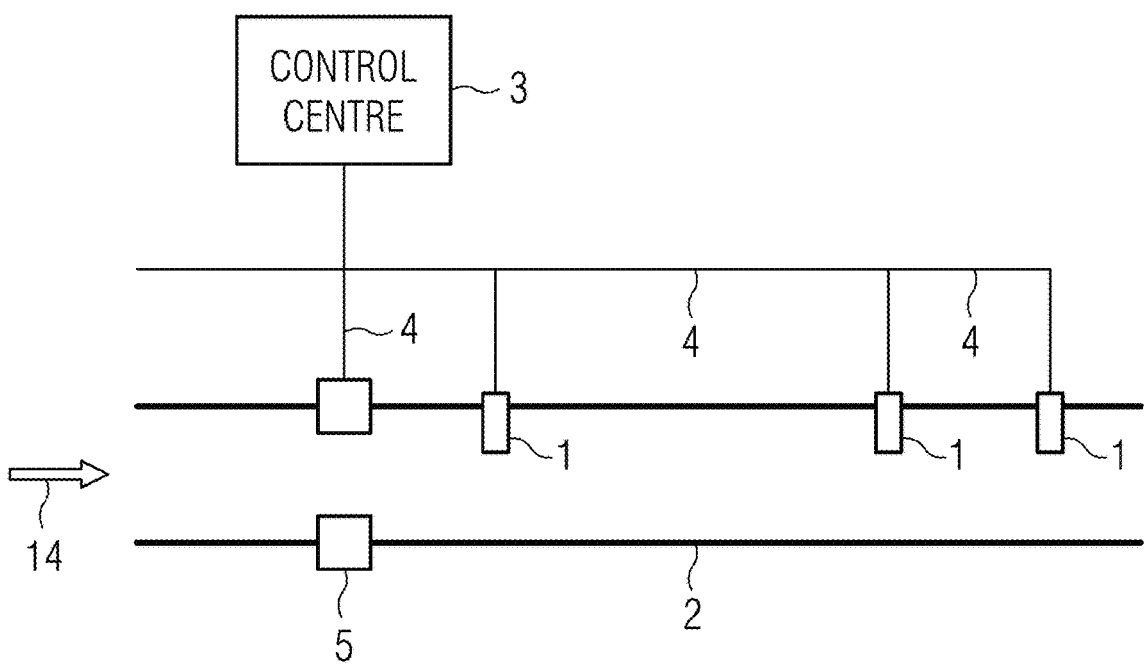
FIG. 1 illustrates an example of a typical subsea pipeline system in which an wear sensor according to the present invention may be used.

FIG. 1 illustrates a typical installation in which an intrusive wear sensor, typically an erosion sensor, may be installed. This type of sensor may be part of a front section of an intrusive erosion probe for use in oil and gas production systems. The present invention enables measurement in real time of material remaining in the front section of the erosion probe, over the lifetime of the sensor and the pipeline or equipment that it is monitoring. Typically, pipelines for oil and gas production are steel, but pipelines made from other materials may be monitored for other applications.

One or more erodible sensors 1, each comprising a sensing element, typically an erosion or corrosion sensing element, may be installed in a pipeline 2 or other media carrying body and be exposed to process media, which may for example, comprise a process fluid such as gas, or oil, together with water, as well as sand and/or chemicals. The grinding action of sand, in particular, may cause erosion of the pipeline and the erosion is affected by the rate at which the sand and other material flows through the pipeline. Corrosion may be caused, for example, by sour service process media that is too harsh for the material grades used. Corrosion may be addressed by using corrosion resistant materials for the pipeline, but erosion is more difficult to prevent. In other cases, components downstream of the sensor may have been mechanically damaged by some other cause, which may also produce particles that wear down the pipeline and other wetted parts. Having multiple sensors in the pipeline allows the location of a particular issue to be determined more easily. An alternative would be to have a single sensor where the process media enters a pipeline section.

Data from the, or each, sensor may be collected in a control centre 3, the data being received at the control centre via communications lines 4. The control centre may be either subsea or topside, or at a remote location, for example when used as a part of an automated condition monitoring system, or part of a subsea grid. The received data may be monitored by operators or to automated to some extent. When detrimental erosion, or corrosion, rates are detected, the operator may send a control signal to the control centre and through communications lines 4 to a valve actuator 5, upstream of the sensor to reduce the flow rate of the process media in the pipeline section. In an automated system, this may be done in response to a trigger value being reached. Accurate measurement of the rate of erosion, or corrosion, allows changes to be made to the extraction process to reduce the amount of damage being done, if the rate of erosion of the pipeline is deemed to be too high.

Figure 2:
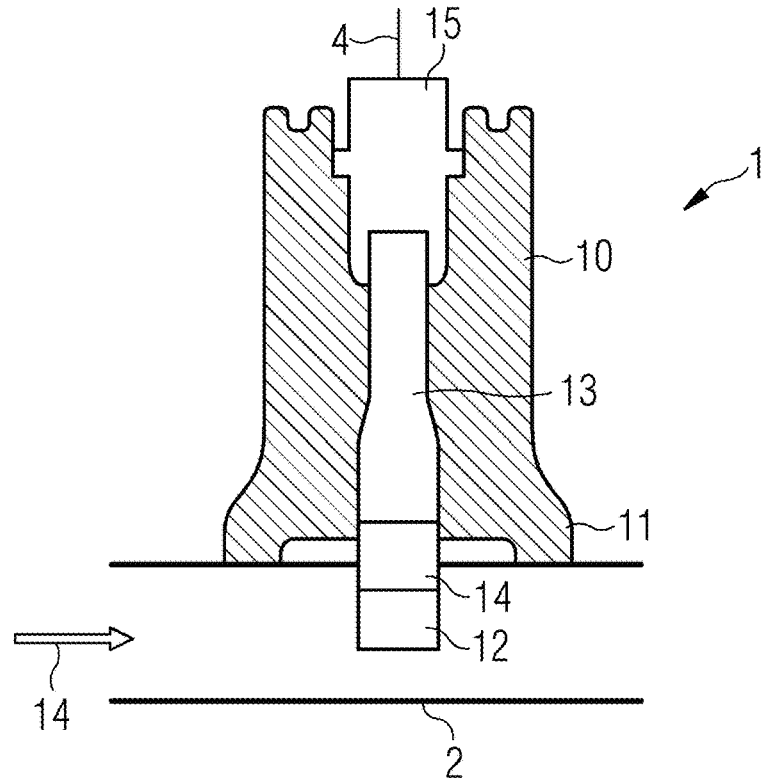
FIG. 2 illustrates an example of an intrusive wear sensor according to the present invention.

FIG. 2 shows a single wear sensor installed on a pipeline. The wear sensor comprises a housing 10 adapted to fit to the pipeline 2, for example by means of a flange 11. The sensor housing 10 is typically an electrically conducting, for example, a metallic housing. The metal may be a metal alloy, for example, a Nickel-Chromium based alloy, such as alloy 625. A sensing element section 12 may protrude into the process fluid flow 14, as shown, or may be mounted flush with the inner surface of the pipeline being monitored. Optionally, the sensing element section 12 may be separated from sensor electronics 13 by an optical penetrator 14. The sensing element 12 may be an integrated section in the optical penetrator 14. A penetrator 15 in the sensor back end allows data to be transferred via communications link 4 to the control centre 3.

Figure 3:
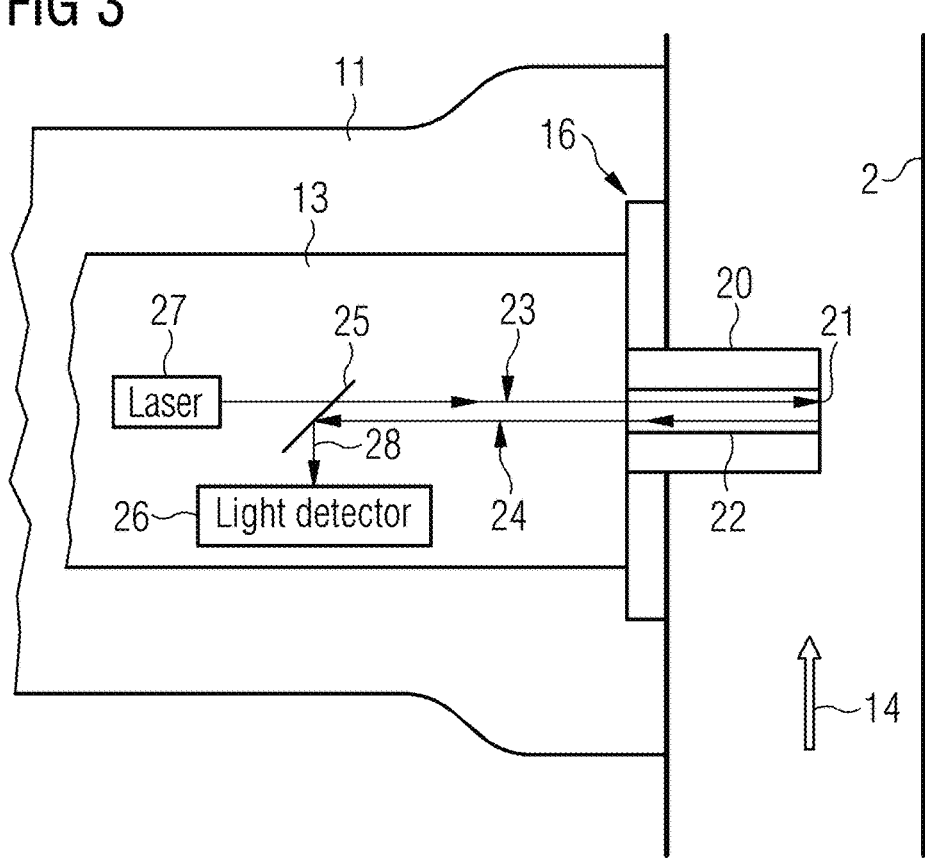
FIG. 3 shows more detail of the sensor of FIG. 2.

FIG. 3 illustrates more detail of the part of the wear sensor of the present invention closest to the process fluid. The thickness of the pipeline 2 being monitored and the amount of wear acceptable before the pipeline is considered in need of replacement is dependent upon the requirements of the pipeline operator. In the example of FIG. 3, an intrusive probe 12 comprises a metal housing 20, a wear sensor element 21 at one end of a glass optical fibre insert 22 in the probe protrudes from the sensor 1 into the process fluid flow 14 in the pipeline 2. Alternative probes that may be used with the examples of FIGS. 2 and 3 are shown in more detail in FIGS. 4a and 4b hereinafter.

The section of the optical sensing element 21, 121, 221 subject to process fluid may have a length and/or a diameter of up to 30 mm according to the application, typically between 5 mm and 30 mm, but larger sections may be used if required. In one example, a diameter of 10 or 12 mm is used. The sensing element may comprise a single optical fibre, or it may comprise two or more optical fibres. A barrier 16 such as an optical penetrator, typically comprising a corrosion resistant metal, such as alloy 625 and optical fibres between the intrusive probe 12, and sensor electronics chamber 13 to protect the sensor electronics from the process fluid and any associated pressure fluctuations. This may be formed as an integral part of the eroding probe. Within the electronics module 13, a light source, such as a laser 27 is provided which sends a light beam 23 down the optical fibre insert 22. The light beam is reflected back when it meets the interface between the end of the fibre and the process fluid, at the wear sensor element 21. The reflected light 24 is guided back to a light detector 26, for example, via a mirror or other reflecting surface 25.

Real time of measurement of the remaining material can be calculated using the optical fibre transmitter 27 and receiver 26 technology to register the end reflection of the glass fibre or fibres. The length of the fibre probe sensing element is measured by converting the light round trip time into a distance. The optical wear sensor 1 enables erosion related wear of the pipeline 2 to be detected by virtue of the change in detected distance that the reflected light beam 24 has travelled, from which wear related changes to the pipeline can be derived.

The optical fibre sensing element is manufactured with a glass, or other optical fibre insert 22 within a metal housing 20 of the intrusion sensor 12. The metal housing may be chosen to erode at substantially the same rate as the main pipeline material, although the materials may not be exactly the same. Alternatively, the control centre is able to derive the equivalent wear rate that represents the wear rate of the pipeline material from the rate at which the optical fibre sensor is worn down and the erosion causes the reflected signal received at the light detector 26 to change. The fibre itself, with the optical fibre insert 22, may only have a thickness of about 0.1 mm, which means that it is delicate and when the protective metal housing 20 is eroded away, the fibre breaks. The rate of erosion can be derived from a change in the reflected optical length measurement, which indicates a proportional amount of wear in the material being monitored. An intrusive optical fibre erosion sensor of this type may be manufactured at a lower cost than current erosion sensors on the market, with increased lifetime and reliability. Where multiple optical fibres are used, the different rates of wear detected for each fibre may help to determine the source of the wear.

Figure 4A:
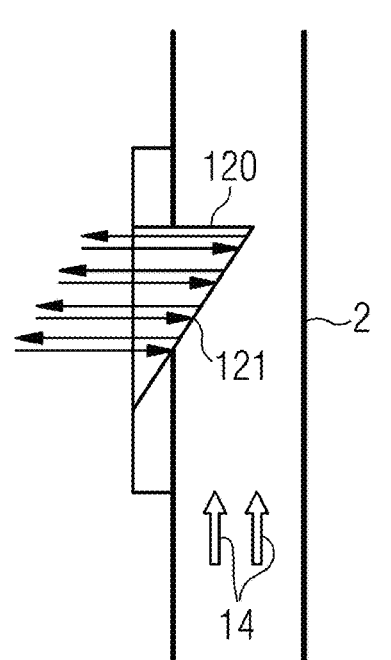
FIGS. 4a and 4b illustrate alternative elements of the sensors of FIGS. 2 and 3; and, FIG. 5 is a flow diagram illustrating a method of detecting wear in a subsea pipeline, according to the present invention.
Figure 4B:
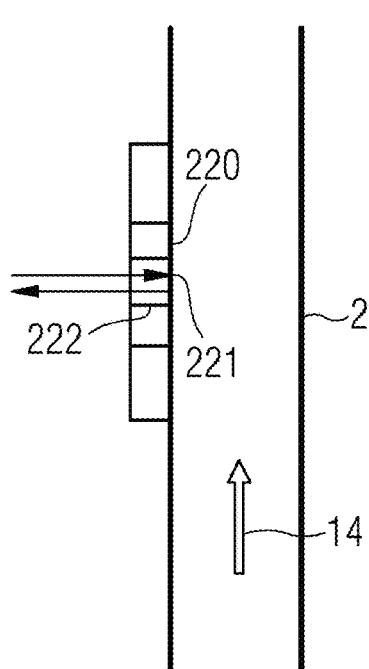

The rest of the system used with the examples of FIGS. 4a and 4b is the same as shown in FIG. 2 or 3, so omitted in FIGS. 4a and 4b for clarity. The example of FIG. 3, with the sensor protruding well into the fluid flow may give rise to turbulence and wear unevenly on the upstream and downstream edges, which can affect the rate at which the fibre 22 contained within the sensor element 12 is eroded and hence the accuracy of the calculations based on path length of the light beam. This design provides a good early warning, but other designs are able to provide greater accuracy.

FIG. 4a illustrates an intrusive probe 120 in a pipeline 2 set at an angle of 45 degrees to the fluid flow 14. In this example, multiple fibres may be used within the wear sensing element to allow for wear at different points across the angled face and hence across the pipeline to be determined. The use of multiple fibres allows for comparisons across the fluid flow cross section, averaging of readings across the section, or to provide redundancy. This angle surface provides more information about the process fluid flow, both in terms of speed and the nature of the content of the fluid, than with the protruding sensor element of FIG. 3. Thus, in FIG. 4a, if the rate of wear determined seems to be too high, it is also possible to determine the changes needed in the rate of fluid flow to bring the rate of wear down to a more acceptable value.

FIG. 4b illustrates a probe 220 mounted flush with an inner surface of the pipeline 2 being monitored. A glass optical fibre insert 222 in a wear sensing element 221 is provided in the centre of the probe 220. The extent to which the material of the pipeline in the vicinity of the flush sensor probe has worn can be related to the extent to which the fibre of the sensor probe wears and the resulting changes in distance travelled for the light beam. In the case of acid wear of the surrounding metal, the fibre itself may not break off directly, but there will still be changes to the reflected light path, wavelength of the end reflection, or signal strength-weakening the reflected signal, due to light escaping through sections of the fibre wall where there is no longer a metal housing containing the light. As with the standard probe design of FIGS. 2 and 3, the examples of FIG. 4 may be used with a combined transmitter receiver without the additional deflector 25, or with separate transmitting 27 and receiving 26 elements and the deflector 25.

Figure 5:
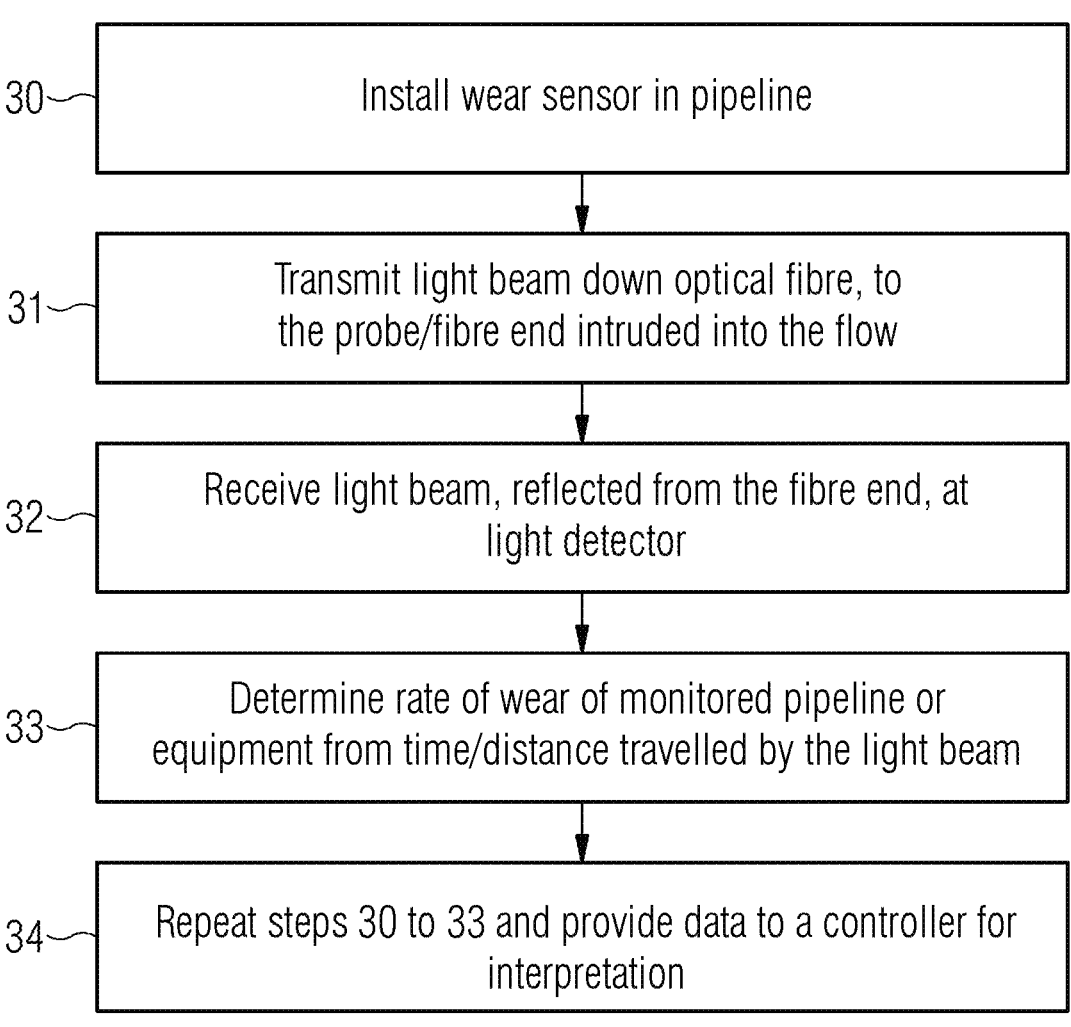

FIG. 5 illustrates a method of detecting wear in a wear sensor in a method according to the invention, for example when used in any of the types of system as described above. The wear sensor is installed 30 in a process fluid pipeline 2 such that one end of the one or more optical fibres 21 is adapted to be directly exposed to a process fluid in use. A light beam is transmitted 31 from the electronics module along the one or more optical fibres to an interface 21, 121, 221, in the form of a probe or fibre end intruded into and in contact with the process fluid, in use. Light is reflected back 32 from the interface with the process fluid to the reflector 25 in the electronics module and detected 32 in the light detector 26. The example illustrates a reflector 25 in the electronics module 13 to divert the light 23 reflected from the interface and send the diverted beam 28 to the detector 26. However, an alternative is to use a combined transmitting and receiving device, in place of the laser source 27, with the light transmitted from a source, or reflected back to a detector, in a single combined light transmitter/receiver. in which case the reflector 25 and separate off axis detector 26 would not be required. This reduces the overall size and costs by reducing separate components.

The time taken for the light to travel from the laser source, along the glass insert to its end, at the interface between the sensing element and the process fluid, then back to the detector may be converted into a distance. As the optical fibre wears, then a change in length of the one or more optical fibres is determined 33 from a change in detected time of travel of the light beam and hence of the derived distance travelled. This information may then be used to derive the extent to which the material being monitored has been worn down, either directly, or as a proportional relationship with the rate of wear of the optical fibre. From stored data relating to the rate of wear of the optical sensor, relative to the rate of wear of the pipeline material, the rate of wear of the pipeline can be determined by calculation and then compared with a predetermined acceptable wear rate. The information may be used to indicate a need for action, such as a change to the rate of process fluid flow, if the wear rate is too high, or may simply be stored and the monitoring continued, in those cases where there is no data giving rise to a concern. Steps 30 to 33 may then be repeated and the data provided to a controller for interpretation.

Instead of the conventional method which relies on resistance or conductance measurements from the sensor changing as the metal erosion sensing element is worn down, the present invention uses an optical fibre as a single sensing element. No separate reference element is required, nor is the thickness (and hence the total lifetime) limited by the electrical properties, as is the case with resistance and conductance measurements, where measured electrical resistance increases as the thickness of a sensing element decreases. Thus, using the optical fibre sensor of the present invention avoids the limitation on thickness that exists with an electrical erosion sensor.

As well as improving reliability of the sensors, by in effect having a sensing element that may be chosen to wear out at a similar rate to the pipeline itself, further cost savings may be achieved by avoiding the cost of retrieving the subsea installation to change the sensors. Such retrieval operations may run to millions of Euros. By offering operators trust-worthy readings for long time periods, which may be in excess of 20 years, adjustments can be made to production to minimize erosion throughout the production life span of the subsea installation, minimising the need for maintenance or replacement of subsea pipelines, or other installations. The sensor may also detect possible pulses of detrimental accumulation of particles caused by reopening of choke valves or from corroded or damaged parts downstream of sensor. Depending on the update rate of the electronics, operation can be shut down before any damage to equipment upstream of the sensor.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein: rather, the invention extends to all functionally equivalent structures, methods and uses, such as are within the scope of the appended claims. Those skilled in the art, having the benefit of the teachings of this specification, may affect numerous modifications thereto and changes may be made without departing from the scope of the invention in its aspects.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. An intrusive wear sensor comprising:

at least two optical fibres (22) mounted in an intrusive probe housing, one end of each of the optical fibres being adapted to protrude into and be directly exposed to a process fluid in use, each fibre having a different length from any other fibre and forming an angled sensor in the process fluid, the length of each fibre being measured with respect to a centerline of the process fluid;

an electronics module mounted in the wear sensor and separated from the process fluid flow by a barrier;

the electronics module comprising a light transmitter to transmit a light beam along each of the optical fibres to an interface with the process fluid; and a light detector to receive the reflected light, whereby a change in length of each of the optical fibres may be determined from a change in detected time of travel of the light beam.

2. A wear sensor according to claim 1, wherein the intrusive wear sensor is operable to determine a rate of wear at different locations across the process fluid.

3. A wear sensor according to claim 1, wherein the sensor further comprises a reflector to receive light reflected back from the interface with the process fluid and direct the reflected light to a separate detector.

4. A wear sensor according to claim 1, wherein the wear sensor further comprises a communications link to a control unit, remote from the sensor.

5. A wear sensor according to claim 4, wherein the sensor further comprises an electrical penetrator between the electronics module and the communications link.

6. A wear sensor according to claim 1, wherein the part of the wear sensor subject to process fluid has a length of between 5 mm to 30 mm.

7. A wear sensor according to claim 1, wherein each sensing element has a diameter of between 5 mm and 30 mm.

8. A wear sensor according to claim 1, wherein the wear sensor further comprises an electrically conducting outer housing containing each sensing element or a plurality of sensing elements.

9. A wear sensor according to claim 8, wherein the material of the outer housing comprises a metal alloy, such as alloy 625.

10. A method of detecting wear in an intrusive wear sensor the method comprising:

installing an intrusive wear sensor in a process fluid pipeline such that one end of each of at least two optical fibres is directly exposed to a process fluid in use each fibre having a different length from any other fibre and forming an angled sensor in the process fluid, the length of each fibre being measured with respect to a centerline of the process fluid within the pipeline;

transmitting a light beam from an electronics module along each of the optical fibres to an interface with the process fluid, receiving light reflected back from the interface with the process fluid at a light detector; and, determining a change in length of each of the optical fibres from a change in detected time of travel of the light beam.

11. A method according to claim 10, wherein the method further comprises providing a reflector in the path of the light reflected back from the interface to the detector; and reflecting the light to the detector in an electronics module.

12. A method according to claim 10, wherein the method further comprises comparing the detected time of travel or determined change of length with stored data to derive a rate of wear of an article being monitored by the wear sensor.

13. A method according to claim 10, wherein the method further comprises transmitting data relating to the detected time of travel or determined change of length to a control unit, remote from the sensor.

* * * * *